(12) United States Patent
Kinson et al.

(10) Patent No.: US 9,346,645 B2
(45) Date of Patent: May 24, 2016

(54) VARIABLE ROTATIONAL SPEED COUPLING FOR A PITCH CHANGING OR SLOW DOWN DEVICE

(71) Applicant: Goss International Americas Inc., Durham, NH (US)

(72) Inventors: Jared David Kinson, Plaistow, NH (US); Dieter Theodor Ebert, North Hampton, NH (US); John James Sposato, Jr., Dover, NH (US); Joseph Adrian St. Ours, Lee, NH (US)

(73) Assignee: Goss International Americas, Inc., Durham, NH (US)

( * ) Notice: Subject to any disclaimer, the term of this patent is extended or adjusted under 35 U.S.C. 154(b) by 178 days.

(21) Appl. No.: 14/066,860

(22) Filed: Oct. 30, 2013

(65) Prior Publication Data

US 2015/0114241 A1   Apr. 30, 2015

(51) Int. Cl.
*B65H 29/12* (2006.01)
*B65H 29/68* (2006.01)
*B65H 5/06* (2006.01)

(52) U.S. Cl.
CPC ............... *B65H 29/12* (2013.01); *B65H 5/062* (2013.01); *B65H 29/68* (2013.01); *B65H 2301/4452* (2013.01); *B65H 2403/514* (2013.01); *B65H 2404/1112* (2013.01); *B65H 2701/1932* (2013.01)

(58) Field of Classification Search
CPC .... B65H 5/062; B65H 29/68; B65H 2513/10; B65H 2513/106; B65H 2513/108; B65H 2513/11; B65H 2301/4452; B65H 2404/1112; B65H 2701/1932; B65H 2403/514; B65H 29/12

USPC .......................................... 271/270, 272, 314
See application file for complete search history.

(56) References Cited

U.S. PATENT DOCUMENTS

| | | | | |
|---|---|---|---|---|
| 5,692,441 A * | 12/1997 | Michalik | ................ | B65H 20/02 101/216 |
| 6,302,391 B1 | 10/2001 | Robert | | |
| 6,572,097 B2 | 6/2003 | d'Argella et al. | | |
| 8,789,462 B2 * | 7/2014 | Chauvin | ............ | G03G 15/1685 101/216 |
| 9,121,475 B2 * | 9/2015 | Kuroda | ..................... | F16H 1/20 |
| 2009/0217833 A1 | 9/2009 | St. ours et al. | | |
| 2011/0101604 A1 * | 5/2011 | Eaton | ..................... | B65H 29/12 271/270 |
| 2012/0193859 A1 | 8/2012 | St. ours et al. | | |
| 2012/0256369 A1 * | 10/2012 | Storey | ................... | B65H 5/062 271/254 |

FOREIGN PATENT DOCUMENTS

DE   102005017411 A1   10/2006
EP      0972733 A2    1/2000

* cited by examiner

*Primary Examiner* — David H Bollinger
(74) *Attorney, Agent, or Firm* — Davidson, Davidson & Kappel, LLC

(57) ABSTRACT

An apparatus for driving a pair of nip rollers at a rotational velocity that varies within each revolution is provided. A first nip roller and a second nip roller form a nip therebetween for moving a sheet or signature. A drive configured and arranged to drive a drive shaft at a constant rotational speed. A pair of variable rotational speed couplings each have an input coupled to the drive, and an output connected to a respective one of the first and second nip rollers. Each coupling rotates its respective nip roller at a rotational speed that varies within each revolution.

12 Claims, 9 Drawing Sheets

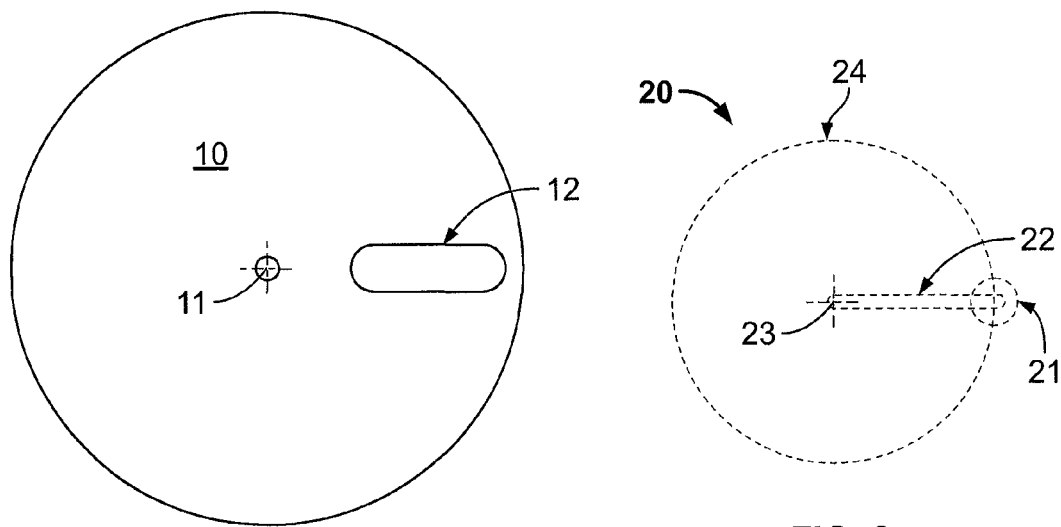
FIG. 1
FIG. 2
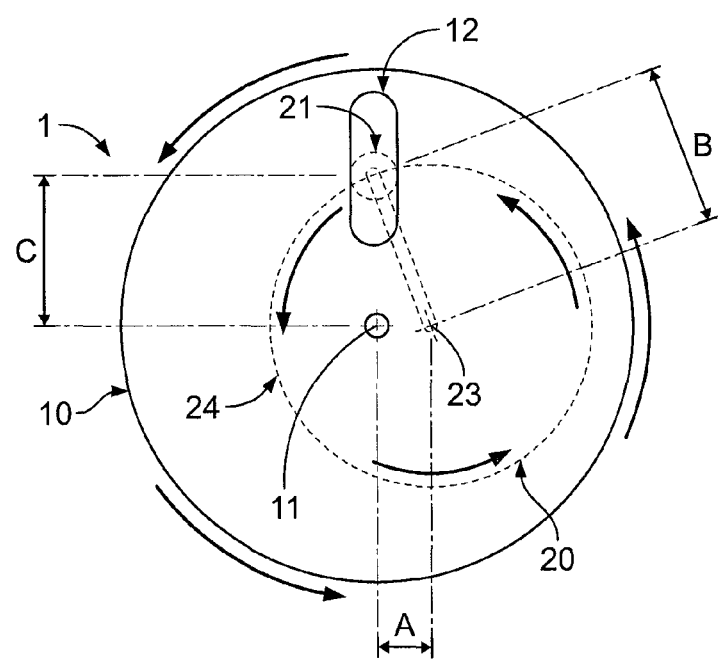
FIG. 3A

VARIABLE ROTATIONAL SPEED COUPLING FOR A PITCH CHANGING OR SLOW DOWN DEVICE

FIELD OF THE INVENTION

The present invention relates generally to drive mechanisms used in printing press and more specifically drive mechanisms used in a folder of a printing press, and in particular drive mechanisms for pitch changing devices or slow down devices.

BACKGROUND

U.S. Publication No. 2009/0217833, incorporated by reference, discloses a pitch changing device. The pitch changing device includes an upper roller mounted on an upper axle, a lower roller mounted on a lower axle, the upper and lower rollers forming a roller nip and a motor driving the upper and lower rollers in opposite directions. The motor has an electronic cam velocity profile designed to increase or decrease pitch of the printed products by increasing or decreasing the velocity of the printed products, respectively.

U.S. Pat. No. 6,572,097, incorporated by reference, purportedly discloses a signature slow-down section in a folder of a printing press for slowing down signatures. The folder is driven by a folder drive mechanism. The signature slow-down section includes a frame, a slow-down mechanism supported by the frame and a motor connected to the slow-down mechanism for rotatably driving the slow-down mechanism separately from the folder drive mechanism.

Offset couplings, elliptical gears, planetary gear devices and Schmidt couplings are used to connect shafts that may be misaligned or are not collinear. However such devices may not be industrial enough to withstand the demanding requirements of the eccentric tube style slow downs or requirements of current folders U.S. Publication No. 2012/0193859, incorporated by reference, includes a drive for a pitch changing device and/or slow down device which is an improvement of the foregoing designs. This orbiting cam drive mechanism includes a first input member rotating in a first direction about a first axis, a second input member concentric with the first input member and rotating in a second direction about the first axis. The second direction is opposite to the first direction. The drive mechanism also includes a plurality of cams connected to the second input member and an orbiting output member. The orbiting output member rotates about a second axis and orbits about the first axis. The second axis is connected to a point on the first input member; the second axis rotates about the first axis. The drive mechanism further includes a plurality of cam followers connected to the orbiting output member and contacting the plurality of cams, the plurality of cam followers rotating about the second axis in the second direction.

Although this orbiting cam drive mechanism is an improvement over prior systems, there is still a need for a lower inertia, more robust pitch changing design that fits into a smaller area while still satisfying a need for higher frequency and faster speeds.

SUMMARY

In accordance with a first embodiment of the present invention, an apparatus for driving a pair of nip rollers at a rotational velocity that varies within each revolution is provided. This apparatus may be used for example, as a pitch changing device or as a slow-down device for sheets or signatures processed by the apparatus. The apparatus includes a first nip roller and a second nip roller, the first and second nip rollers forming a nip therebetween for moving a sheet or signature. A drive is configured and arranged to drive a drive shaft at a constant rotational speed. Also provided are first and second variable rotational speed couplings. The first variable rotational speed coupling has an input coupled to the drive, and further has an output connected to the first nip roller that rotates the first nip roller at a rotational speed that varies within each revolution. The second variable rotational speed coupling similarly has an input coupled to the drive, and further has an output connected to the second nip roller that rotates the second nip roller at the rotational speed that varies within each revolution.

In accordance with other aspects of the first embodiment, the first and second nip rollers may, for example, be in the shape of a half-cylinder and/or may have an elastomeric outer surface defining the nip.

A second embodiment of the present invention is directed to a variable rotational speed coupling independent of the pitch changing device. Accordingly, in the discussion that follows it is to be understood that the various additional aspects discussed can be employed in both the first and second embodiments as indicated.

In accordance with another aspect of the first and second embodiments, the (or each) coupling may include a first component supported for rotation about a first axis and a second component supported for rotation about a second axis, where the second axis spaced apart radially from the first axis. The coupling may further include a support arm having a first end connected to the second axis, the first end rotationally fixed with respect to the second axis, the support arm having a second end movably connected to the first component, the second end movable radially with respect to the first axis.

In accordance with another aspect of the first embodiment, the first coupling may be connected to the first nip roller at one of the first and second components of the first variable rotational speed coupling; and the second coupling may be connected to the second nip roller at one of the first and second components of the second variable rotational speed coupling.

In accordance with yet another aspect of the first embodiment, the first variable rotational speed coupling may connected to the first nip roller at the second component of the first variable rotational speed coupling, and the second variable rotational speed coupling may be connected to the second nip roller at the second component of the second variable rotational speed coupling. The drive may be configured and arranged to drive the first component of the first variable rotational speed coupling at the constant rotational speed about the first axis of the first variable rotational speed coupling, and to drive the first component of the second variable rotational speed coupling at the constant rotational speed about the first axis of the second variable rotational speed coupling.

In accordance with another aspect of the second embodiment, a drive is provided which is configured and arranged to drive the first component at a constant rotational speed about the first axis. Alternatively, the drive may, for example, be configured and arranged to drive the second component at a constant rotational speed about the second axis.

In accordance with yet another aspect of the first embodiment, the first variable rotational speed coupling may be connected to the first nip roller drive shaft at the first component of the first variable rotational speed coupling, and the second variable rotational speed coupling may be connected to the second nip roller drive shaft at the first component of the second variable rotational speed coupling. The drive may be configured and arranged to drive the second component of the first variable rotational speed coupling at a constant rotational speed about the second axis of the first variable rotational speed coupling, and to drive the second component of the second variable rotational speed coupling at a constant rotational speed about the second axis of the second variable rotational speed coupling.

In accordance with another aspect of the first and second embodiments, the (or each) coupling may include a drive shaft supporting the first component for rotation about the first axis. The drive shaft may have a first end and a second, the first end of the drive shaft connected to the first component. The drive may be configured and arranged to rotate the drive shaft(s) of the coupling(s).

In accordance with a further aspect of the first and second embodiments, in the (or each) coupling, the second end of the support arm is movably connected to the first component at a first location, and a third component is supported for rotation about the first axis by the drive shaft of the coupling. The second end of the drive shaft of the coupling is connected to the second component. A counterweight is supported for rotation about a third axis, where the third axis concentric with the second axis. A counterweight support arm has a first end connected to the third axis, where the first end is rotationally fixed with respect to the third axis. The counterweight support arm has a second end movably connected to the third component at a second location on the third component that is offset 180 degrees from the first location of the first component. The second end of the counterweight support arm is movable radially with respect to the first axis.

In accordance with another aspect of the first and second embodiments, in the (or each) coupling, the first component may be a cam having a cam profile, wherein the second end of the support arm is connected to a cam follower, and the cam follower is configured and arranged to move along with cam profile.

In accordance with another aspect of the first and second embodiments, in the (or each) coupling a rail may be secured radially on the first component, wherein the second end of the support arm is slidingly connected to the rail.

In accordance with another aspect of the first and second embodiments, in the (or each) coupling, the first component may include a radially extending recess, wherein the second end of the support arm is movingly connected to the recess.

In accordance with another aspect of the first and second embodiments, the rotational speed of the second component $V2(t)=V1*(C(t)/B(t))$ as a function of time (t), where V1 is the constant rotational velocity of the first component, C(t) is a distance between the second end of the support arm and the first axis at a time (t), and B is a distance between the first and second ends of the support arm.

BRIEF DESCRIPTION OF THE DRAWINGS

FIG. 1 is a schematic representation of a cam of a two piece offset coupling in accordance with an embodiment of the present invention.

FIG. 2 is a schematic representation of a follower assembly in the two piece offset coupling in accordance with an embodiment of the present invention.

FIG. 3A is a schematic representation of the follower assembly and the cam assembled as a two piece offset coupling.

DETAILED DESCRIPTION

This present invention eliminates the need for translating shafts or eccentric nips to produce a pitch changing device with a constant speed input. In other words, it converts a constant rotational input velocity into a variable rotational output velocity.

Figure 3B:
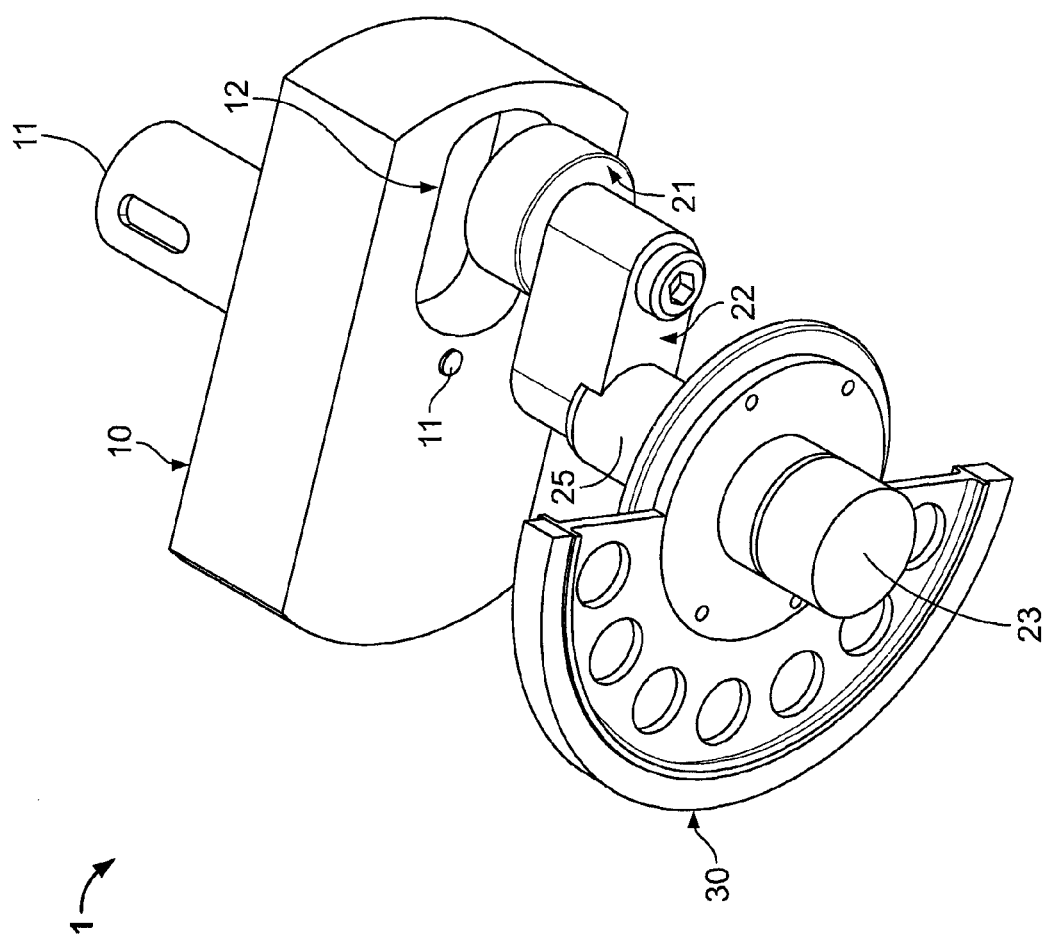
FIG. 3B is an illustrative design of the two piece offset coupling of FIG. 3A.
Figure 4C:
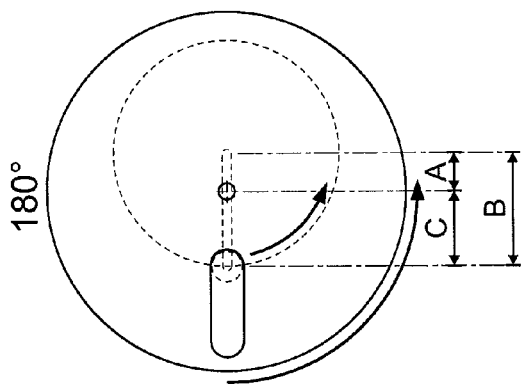
FIG. 4(A) through 4(E) is a representation of a progression through one full revolution of the cam in 90 degree increments.
Figure 4B:
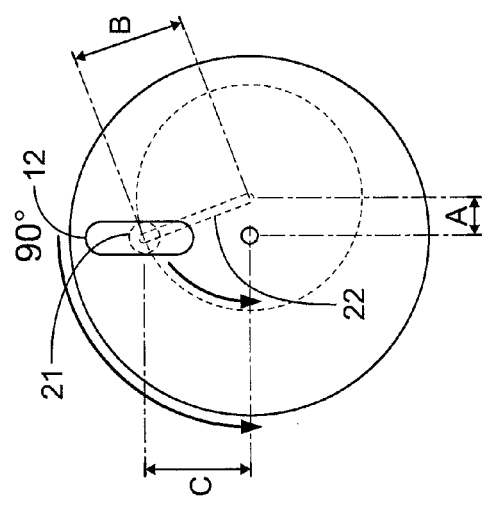
Figure 4E:
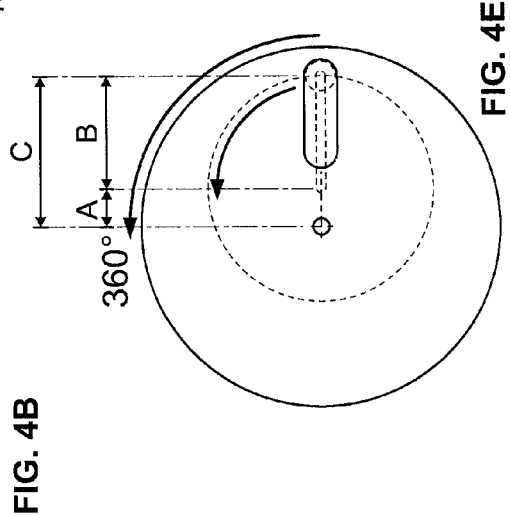
Figure 4A:
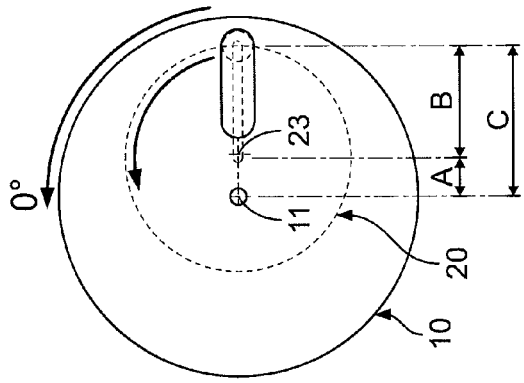
Figure 4D:
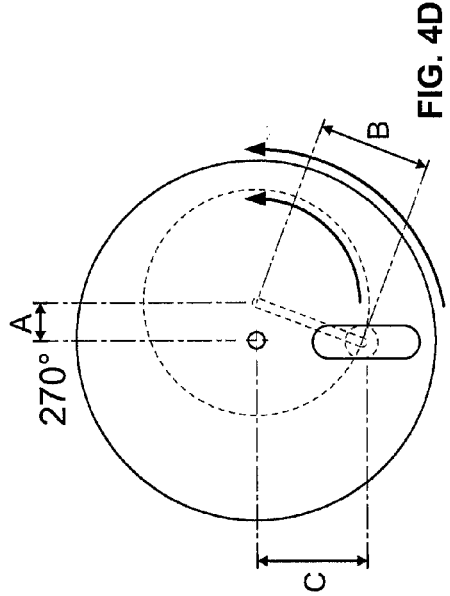

Referring to FIGS. 3A and 3B, a drive mechanism includes a variable rotational speed coupling in the form of an offset coupling 1 that converts a constant rotational input velocity into a variable rotational output velocity.

FIG. 1 is a schematic representation of one of the pieces in this offset coupling 1. This piece will be referred to herein as the cam 10, and is an example of the first component discussed above. The cam 10 rotates about the cam center 11. The cam 10 is the driver of the mechanism 1 and rotates at a constant rpm (rotations per minute). Unlike prior art techniques that transmit torque through a single gear tooth, this design transmits torque through a robust cam follower.

FIG. 2 is a schematic representation of the second piece in this mechanism. This second piece will be referred to as the follower assembly. The follower assembly 20 includes a cam follower 21 attached to a support arm 22 that rotates about a fixed point referred to herein as the nip center 23. The follower assembly 20 in FIG. 2 acts as the driven center.

It will be appreciated that in alternative designs, the follower assembly 20 can act as the driver and the cam center of the cam 10 can act as the driven center.

FIG. 3A shows a schematic illustration of the cam 10 and follower assembly 20 assembled as a two piece coupling 1. In this illustration the cam 10 is rotating in a counterclockwise direction about the cam center point 11. While the cam follower 21 orbits about the nip center point 23, its rotational position is forced to stay in contact with the cam profile 12 while it follows the path 24 as illustrated. The cam center point and the nip center point are fixed at a distance "A." This distance "A" will be referred to herein as the "offset." The radius of which the cam follower orbits about the nip center is shown as distance "B." Distance "C" is the radius length that the cam follower is from the cam center point at that instant in time. The velocity of the follower assembly 20 about the nip center 23 can be calculated with the equation $V*(C(t)/B)$, where V is the angular inlet velocity of the cam. FIG. 3B shows an illustrative design of the two piece coupling of FIG. 3A, including the connection to a nip wheel 30 via a shaft 25. Shaft 25 is an example of the second component discussed above. As illustrated in FIG. 3B, the shape of the cam 10 need not be cylindrical as shown in FIG. 3A. Rather, it can have any desired shape provided that it includes a cam profile 12 that rotates about a cam center 11.

FIG. 4(A) through 4(E) is a representation of a progression through one full revolution of the cam 10. The cam 10 rotates at a constant rpm in the counterclockwise direction. The follower assembly 20 also rotates in a counterclockwise direction but its rpm changes as the distance C changes. At "0°" cam position, the offset and follower arm are aligned which puts distance C at its maximum distance. In this position, distance C=A+B. The follower assembly 20 will be at its maximum velocity.

As the cam 10 rotates to the 90° position, the cam follower 21 travels down the cam profile 12, reducing the distance C. This in turn reduces drive ratio and the follower assembly rpm.

At the 180° cam position, the offset A and follower arm 22 are once again aligned but are now overlapping. At this position, distance C is at its shortest with C=B−A. In this position the follower assembly 20 has reached its slowest rpm.

As the cam rotates to the 270° position, the cam follower 21 travels back up the cam profile 12, increasing the distance C. This in turn forces the follower assembly's rpm to accelerate. The follower assembly continues to increase its rpm until the cam 10 reaches the 360° position. At this point the deceleration of the follower assembly starts over.

With each 360° revolution of the cam 10, there is one deceleration and acceleration cycle of the follower assembly 20. The follower assembly's maximum and minimum velocities can be adjusted to desired values by adjusting the values of distances A and B.

Figure 5A:
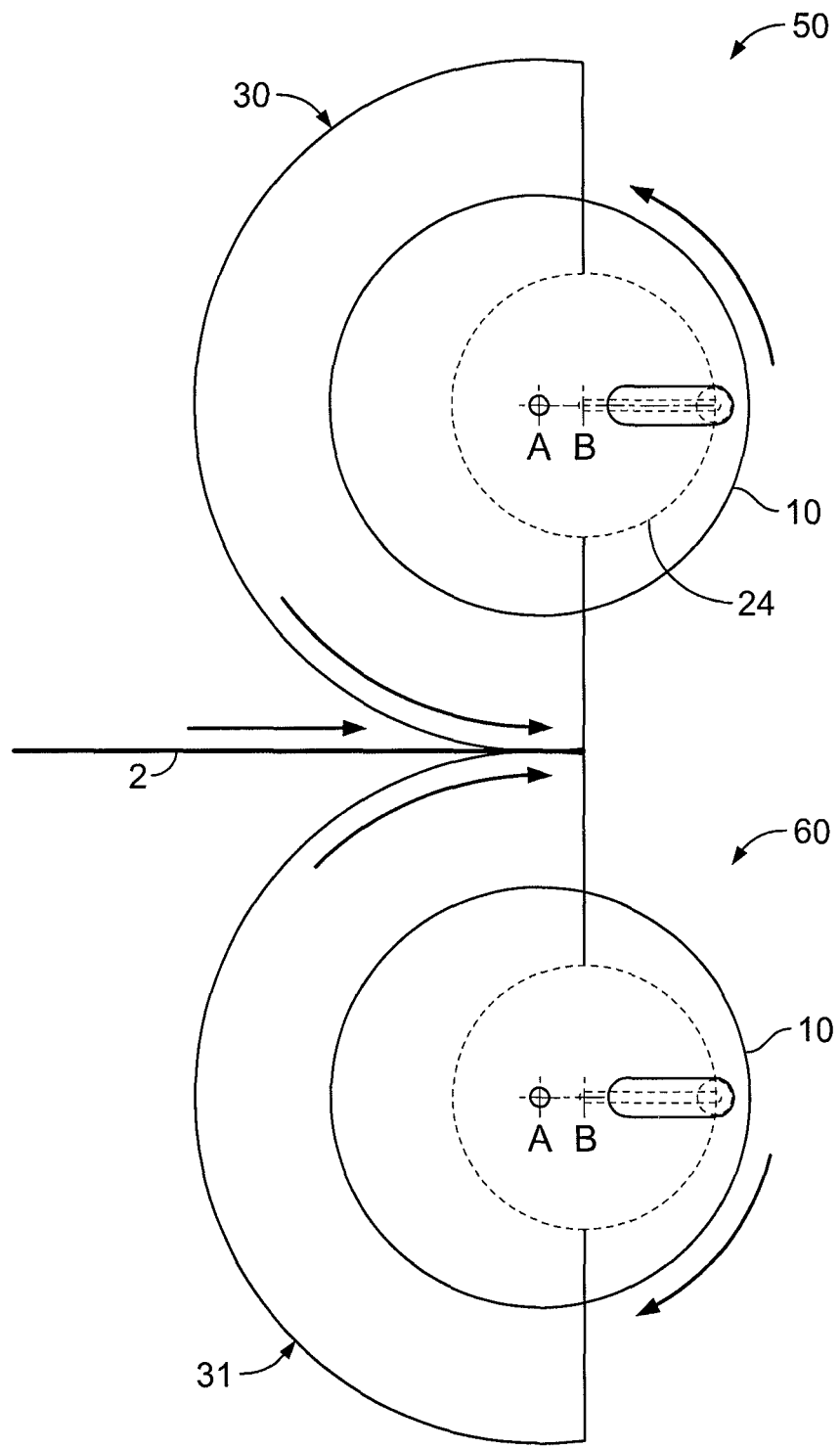
FIG. 5A is a schematic representation of a pair of two piece offset couplings incorporated into a pitch changing device.
Figure 5B:
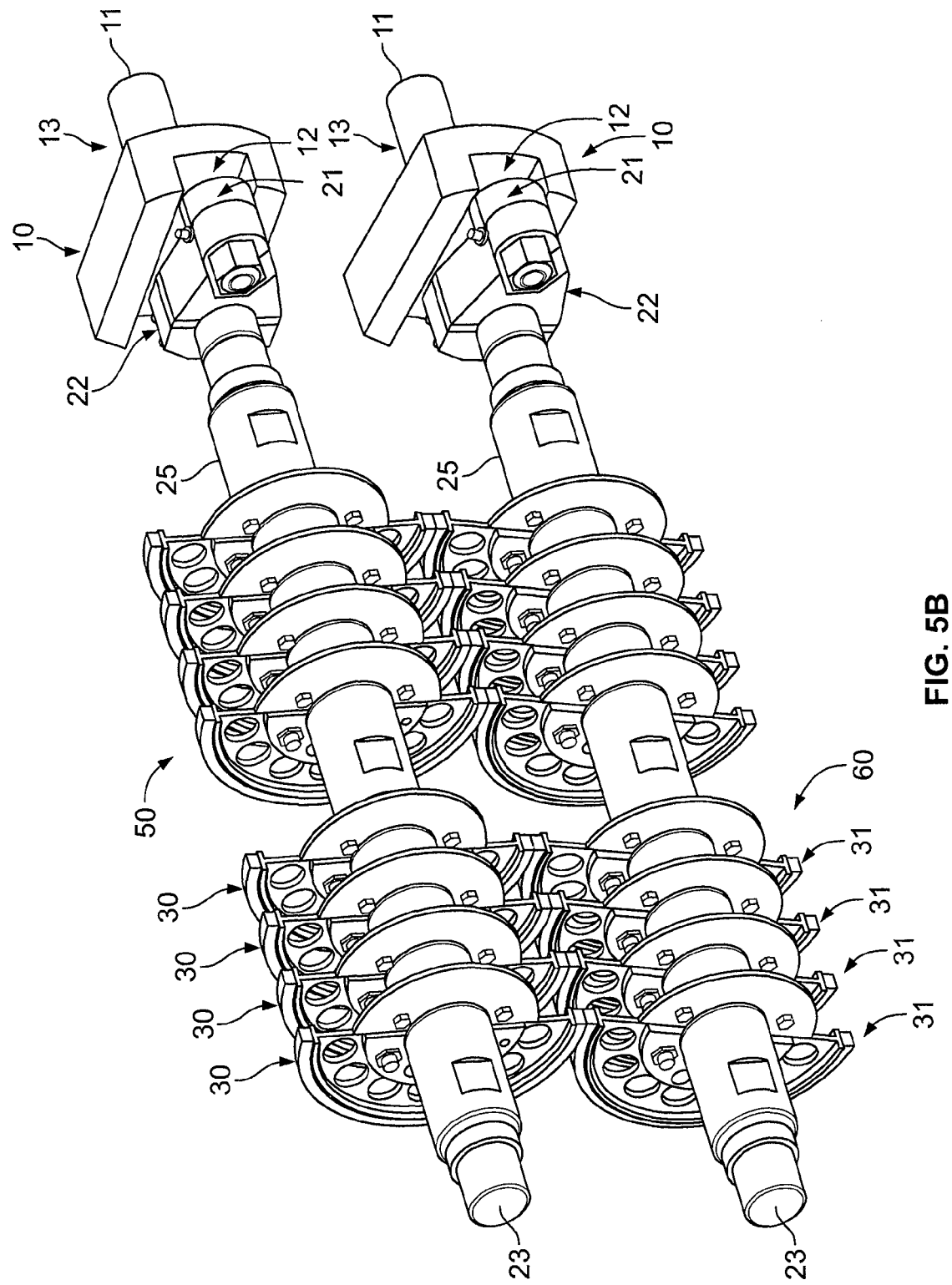
FIG. 5B is an illustrative design of the pitch changing device of FIG. 5A.

FIG. 5A is a schematic representation of how this mechanism 1 can be used as a pitch changing device. FIG. 5B is an illustrative design of the pitch changing device of FIG. 5A.

Figure 5C:
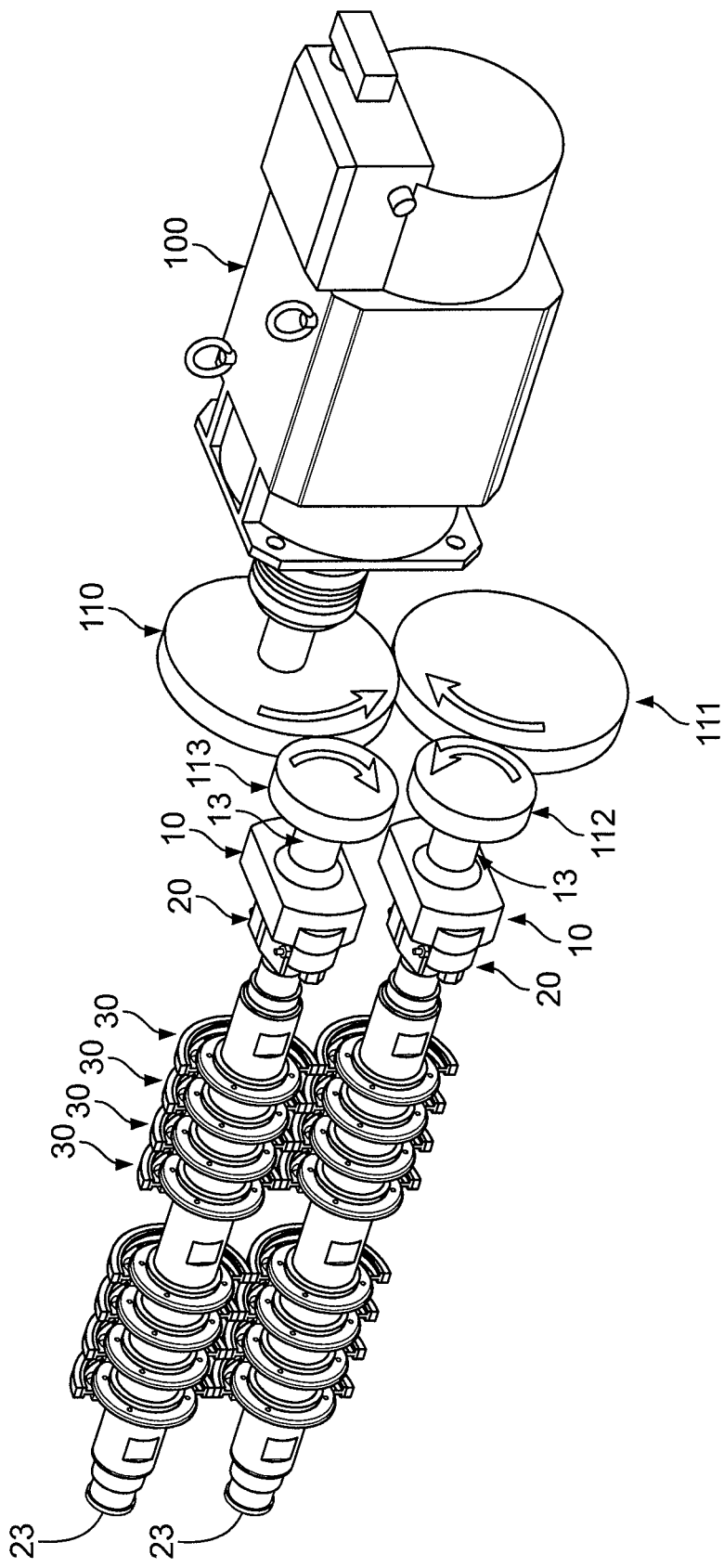
FIG. 5C shows the pitch changing device 5B connected to a motor.

A rubber covered nip wheel 30 is attached to the follower 21 to form an upper nip wheel assembly 50. As one of ordinary skill in the art will appreciate, although we use the term rubber for convenience, it should be understood that the covering could be natural rubber, artificial rubber, or any other suitable elastomeric nip material. With this nip wheel 30 directly attached to follower 21, the nip wheel will experience the same changes in velocity as the follower 21. A second lower nip wheel assembly 60 is located below the upper nip wheel assembly 50 in a way where the opposing surfaces of upper nip wheel 30 and lower nip wheel 31 form a nip. The two nip wheel assemblies 50, 60 are driven simultaneously in opposite rotational directions to drive signatures. The input drive is timed to the frequency of the incoming signatures. Each revolution of the rubber covered nip wheels 30, 31 will grab the signature at its maximum velocity and then release the signature at its minimum velocity. The nip wheels 30, 31 could also be phased in a way that the signatures could be accelerated as it passes through the nip wheels. FIG. 5C shows the pitch changing device 5B connected to a motor 100 which drives the assemblies 50, 60 via gears 110-113 and cam center drive shafts 13.

Figure 6A:
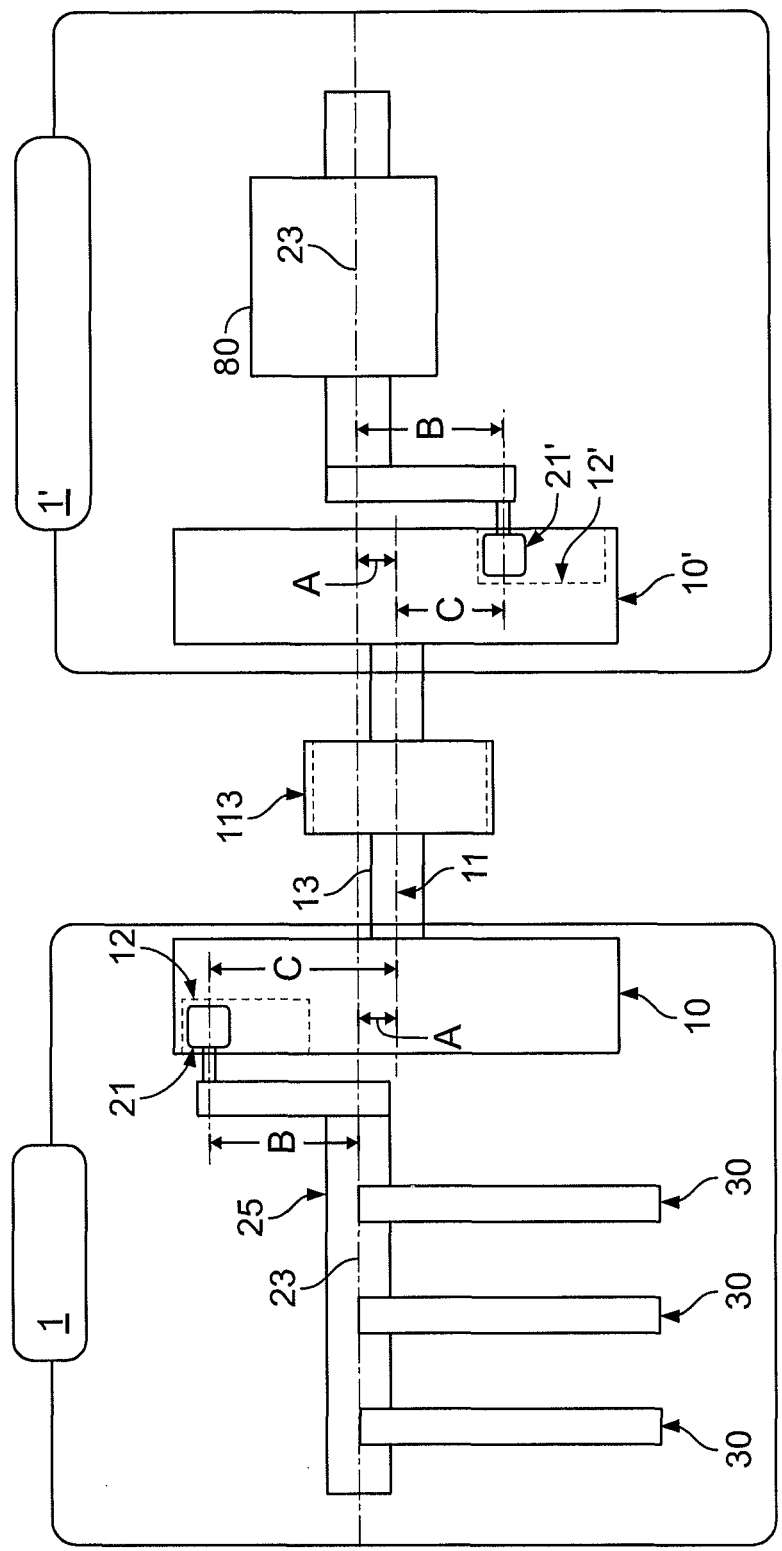
FIG. 6A illustrates a pitch changing device including a pair of two piece offset couplings and an active counterweight in accordance with a further embodiment of the present invention.
Figure 6B:
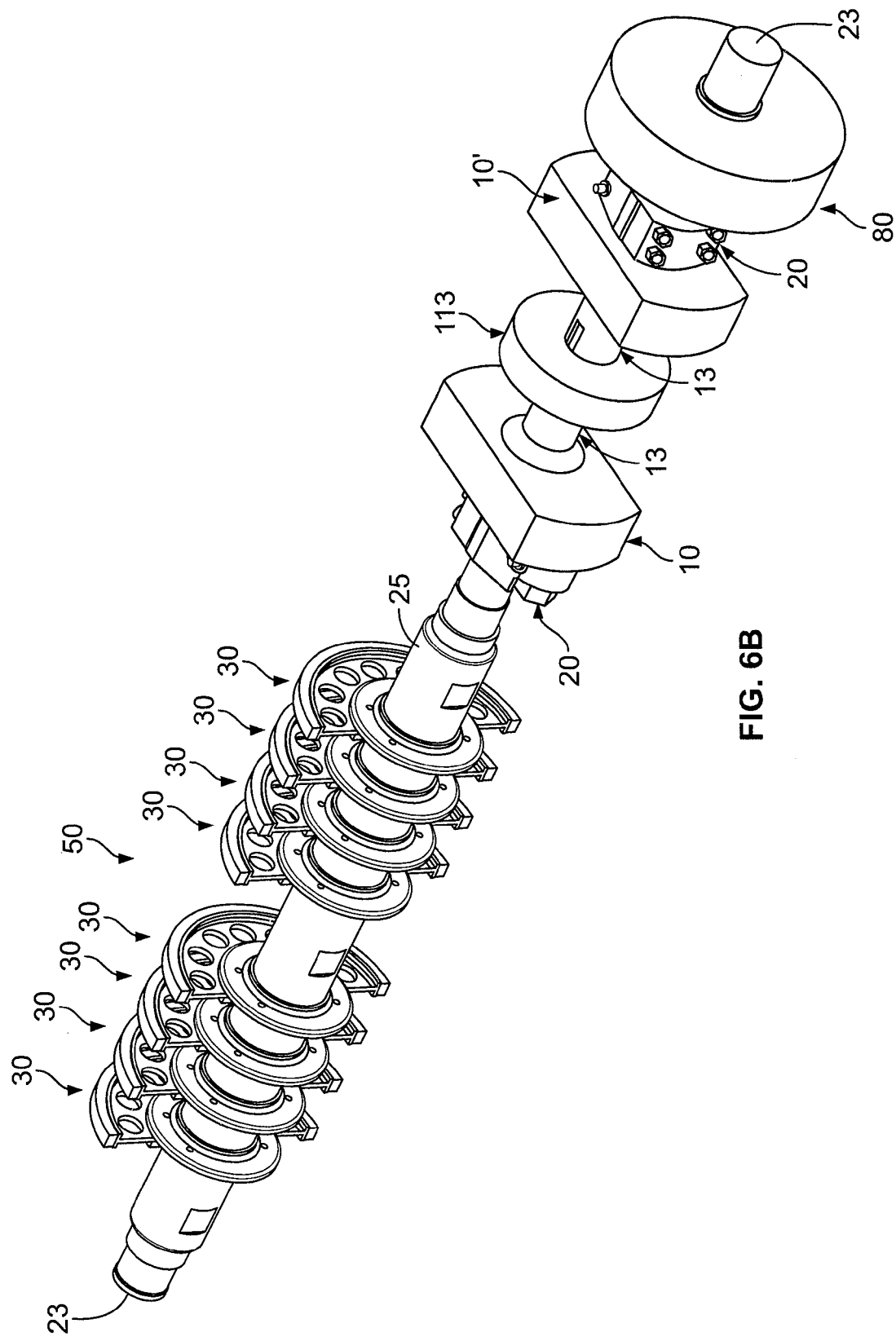
FIG. 6B is an illustrative design of the pitch changing device of FIG. 6A.

FIGS. 6A and 6B illustrate a pitch changing device including a pair of two piece offset couplings and an active counterweight in accordance with a further embodiment of the present invention. FIG. 6A is a schematic illustration and FIG. 6B shows an illustrative design. As the cam 10 rotates and drives the follower assembly 20 of the mechanism through its cycles of acceleration and deceleration, there is a reflective torque put back on the shaft 13 driving cam center 11, created by the inertia of the follower assembly 20. This inertia is directly related to all the mass (nip wheel assembly 50) that rotates about the nip center line 23 and the amount of acceleration it experiences. This cycling torque on the cam center drive shaft 13 could possibly affect the position accuracy of the motor driving the shaft 13. Efforts to lower the inertia of each nip wheel assembly will lower the reflective torque but this alone with not completely eliminate these cyclic forces.

To dampen the cycling torque demand on the motor a flywheel could be employed. However, the flywheel would be large, typically in excess of ten (10) times the system inertia. This additional inertia could increase the size of the required motor to satisfy E-stop requirements. To further reduce the amount of torque reflected back to the motor, an additional rotating mass could be added to the system to counter act the torque created by each nip wheel assembly. For the remainder of the disclosure this additional rotating mass will be referred to as the active counter weight 80. A motor will drive the system through a gear 113 or belt configuration.

The driven gear 113 will rotate about the cam (and gear) centerline 11 and drive two opposing cams 10, 10'. One cam 10 will drive a nip wheel assembly 50 as described earlier and the other cam 10', positioned 180 degrees relative to the first cam 10 (see FIG. 6A), will drive the active counter weight 80. Assembly 50 and active counter weight 80 will rotate about the same center line 23 and offset (distance A) from the cam center 11, with the same size follower and follower arm length (distance B). With all these parameters being equal the rpm's of the nip wheel assembly and the active counter weight will accelerate and decelerate at the same amount. With the two cams out of phase by 180 degrees, when the nip wheel assembly is at its maximum rpm, the active counter weight will be at its minimum rpm (shown in FIG. 6A). As the cams rotate the nip wheel assembly will begin to decelerate as the active count weight will begin to accelerate. With the mass of the active counter weight being equal to the nip wheel assembly, the inertias of these two rotating masses will produce nearly equal and opposite forces back to the driven gear.

Figure 7:
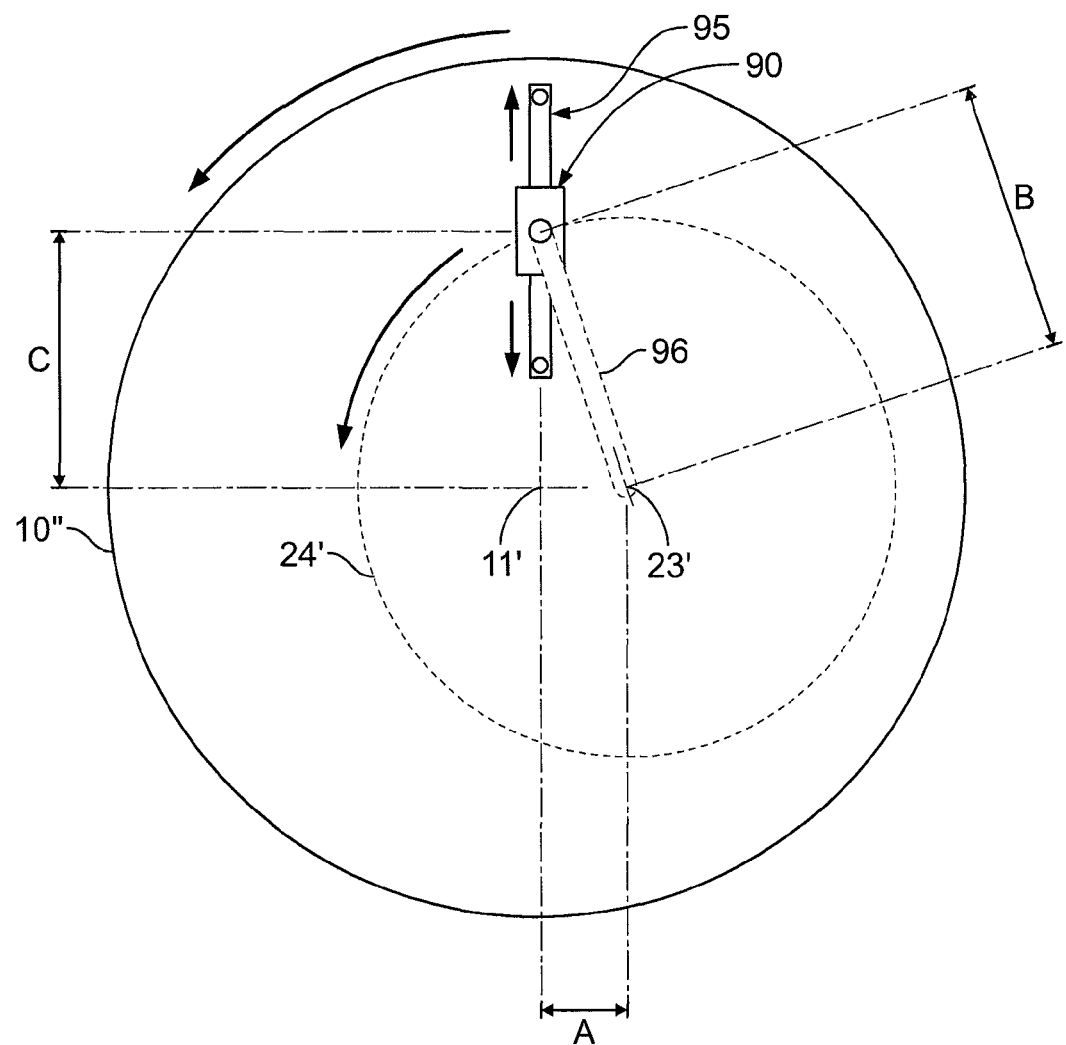
FIG. 7 shows alternative embodiment of the present invention wherein two offset, fixed position, rotating shafts are driven with a linear slide is used as a substitute to using a cam follower and cam.

Although a cam follower and cam mechanism is discussed above, other types of assemblies can alternatively be used to impart the desired motion. FIG. 7, for example, shows another way of driving two offset, fixed position, rotating shafts. A rail 95 is secured to a support 10" that rotates about driving center 11'. Although support 10" is shown having a cylindrical shape, this is not necessary. As with the cam 10, the support 10" can have any desired shape provided that it rotates the rail 95 about the driving center 11'. A linear slide 90 is connected via a linkage arm 96 to driven center 23'. Linear slide 90 is used as a substitute to using a cam follower and cam. In this particular layout, the rail 95 rotates about the driving center line 11', and the slide 90 rotates about the driven center line 23'. As the rail 95 rotates about the driving centerline 11', the slide 90 travels up and down the rail 95 as it rotates along the path 24'. This changes the length of distance C which will force the rpm of the link 96 about the driven center to accelerate and decelerate. This designed can be implemented as a pitch changing device in the same manner described above with regard to FIGS. 1-6, with for example the drive center 11" driven by a shaft 13, and a nip wheel 30 connected to support arm 96 at the driven center 23'.

In the preceding specification, the invention has been described with reference to specific exemplary embodiments and examples thereof. It will, however, be evident that various modifications and changes may be made thereto without departing from the broader spirit and scope of invention as set forth in the claims that follow. For example, although a rail 95 is shown in FIG. 7 providing a radial motion relative to axis 11', and a cam profile 12 or recess is shown in FIG. 3 providing a radial motion relative to axis 11, it should be understood that other arrangements could be provided to provide the desired motion relative to axis 11, 11'. The specification and drawings are accordingly to be regarded in an illustrative manner rather than a restrictive sense.

What is claimed is:

1. An apparatus for driving a pair of nip rollers at a rotational velocity that varies within each revolution, comprising:
   a first nip roller and a second nip roller, the first and second nip rollers forming a nip therebetween for moving a sheet or signature;
   a drive, the drive configured and arranged to drive at a constant rotational speed;
   a first variable rotational speed coupling having an input coupled to the drive, the first variable speed coupling having an output connected to the first nip roller that rotates the first nip roller at a rotational speed that varies within each revolution;
   a second variable rotational speed coupling having an input coupled to the drive, the second variable speed coupling having an output connected to the second nip roller that rotates the second nip roller at the rotational speed that varies within each revolution.

2. The apparatus of claim 1, wherein each of the first and second variable rotational speed couplings includes:
   a first component supported for rotation about a first axis;
   a second component supported for rotation about a second axis, the second axis spaced apart radially from the first axis; and
   a support arm having a first end connected to the second axis, the first end rotationally fixed with respect to the second axis, the support arm having a second end movably connected to the first component, the second end movable radially with respect to the first axis;
   wherein the first coupling is connected to the first nip roller at one of the first and second components of the first variable rotational speed coupling;
   wherein the second coupling is connected to the second nip roller at one of the first and second components of the second variable rotational speed coupling.

3. The apparatus of claim 2 wherein the first variable rotational speed coupling is connected to the first nip roller at the second component of the first variable rotational speed coupling, and the second variable rotational speed coupling is connected to the second nip roller at the second component of the second variable rotational speed coupling; and
   wherein the input of the first variable rotational speed coupling is connected to the first component and the input of the second variable rotational speed coupling is connected to the first component, the driver driving the first coupling and second coupling at the constant rotational speed about the first axis of the first variable rotational speed coupling, and first axis of the second variable rotational speed coupling, respectively.

4. The apparatus of claim 3, wherein:
   each of the first and second variable rotational speed couplings includes a drive shaft supporting the first component for rotation about the first axis, the drive shaft having a first end and a second, the first end of the drive shaft connected to the first component; and
   wherein the drive is configured and arranged to rotate the drive shafts of the first and second variable rotational speed couplings.

5. The apparatus of claim 4,
   wherein, in each of the first and second variable rotational speed couplings the second end of the support arm is movably connected to the first component at a first location; and
   wherein each of the first and second variable rotational speed couplings further include:
   a third component supported for rotation about the first axis by the drive shaft, the second end of the drive shaft connected to the second component;
   a counterweight supported for rotation about a third axis, the third axis concentric with the second axis;
   a counterweight support arm having a first end connected to the third axis, the first end rotationally fixed with respect to the third axis, the counterweight support arm having a second end movably connected to the third component at a second location on the third component that is offset 180 degrees from the first location of the first component, the second end of the counterweight support arm movable radially with respect to the first axis.

6. The apparatus of claim 3, wherein, in each of the first and second variable rotational speed couplings, the output rotational speed V2(t)=V1*(C(t)/B(t)) as a function of time (t), where V1 is the constant rotational velocity, C(t) is a distance between the second end of the support arm and the first axis at a time (t), and B is a distance between the first and second ends of the support arm.

7. The apparatus of claim 2 wherein the first variable rotational speed coupling is connected to the first nip roller at the first component of the first variable rotational speed coupling, and the second variable rotational speed coupling is connected to the second nip roller at the first component of the second variable rotational speed coupling; and
   wherein the input of the first variable rotational speed coupling is the second component and the input of the second variable rotational speed coupling is the second component, the driver driving the first coupling and second coupling at a constant rotational speed about the second axis of the first variable rotational speed coupling and about the second axis of the second variable rotational speed coupling, respectively.

8. The apparatus according to claim 2, wherein, for at least one of the first and second variable rotational speed couplings:
   the first component is a cam having a cam profile, and wherein the second end of the support arm is connected to a cam follower, the cam follower configured and arranged to move along with cam profile.

9. The apparatus according to claim 2, wherein for at least one of the first and second variable rotational speed couplings:
   a rail is secured radially on the first component, and wherein the second end of the support arm is slidingly connected to the rail.

10. The apparatus according to claim 2, wherein for at least one of the first and second variable rotational speed couplings:
    the first component includes a radially extending recess, and wherein the second end of the support arm is movingly connected to the recess.

11. The apparatus of claim 1, wherein each of the first and second nip rollers are in the shape of a half-cylinder.

12. The apparatus of claim 1, wherein each of the first and second nip rollers have an elastomeric outer surface defining the nip.

* * * * *